Patented Oct. 15, 1940

2,218,334

UNITED STATES PATENT OFFICE 2,218,334

MANUFACTURE OF GLASS

Philip E. Harth, Clayton, Mo.

No Drawing. Application August 28, 1937,
Serial No. 161,411

7 Claims. (Cl. 106—36.1)

This invention relates, generally, to the manufacture of glass, and particularly to a process of making glass wherein an improved fluxing and fining agent is employed.

In the manufacture of glass, fluorspar has been used to a substantial extent as a fluxing and fining agent. Fluorspar for this use has ordinarily been required to be of a relatively high degree of purity, as example, one containing from 92–98% calcium fluoride. A common low grade fluorspar has not been regarded as suitable for this purpose, largely because of the high percentage of impurities which are introduced into the glass batch with consequent deleterious effects and disadvantageous influences, either upon the treatment of the batch or upon the resultant glass.

Barium sulphate has likewise, to some extent, been used as a glass batch ingredient, but, as in the case of fluorspar, only barium sulphate or barite ore of a high degree of purity has been considered for this use.

The object of the present invention, generally stated, is to provide a glass batch and the process of making glass wherein a fluorspar-barite ore is employed.

Another object of the present invention is to provide a glass batch and a process of making glass wherein a combination of agents is employed capable of reacting under the conditions encountered in melting the glass batch to facilitate the removal of iron contaminations.

A more specific object of the present invention is to provide a fluxing and fining agent containing a fluorspar-barite ore, together with an agent capable of reacting in the molten glass batch to produce nascent chlorine under conditions such that it will react with iron.

In accordance with the present invention, generally stated, a fluorspar-barite ore of the character found quite abundantly in certain sections of Kentucky and Illinois, as well as other localities, is employed as an initial ingredient of the glass batch. Substantial deposits of such fluorspar-barite ore are to be found in Crittenden County, Kentucky, in the vicinity of the town of Marion, and also near Harrodsburg, Mercer County, Kentucky. This fluorspar-barite ore varies in composition from about equal proportions of fluorspar and barium sulphate to about 80% fluorspar with 20% barium sulphate; a typical example being an ore which contains 70% fluorspar and 30% barite. The proportions of barium sulphate and fluorspar in the fluorspar-barite ore employed in any particular glass batch may approximate the fluorspar and barium sulphate content desired in the glass batch, and it will be understood that in order to provide a fluorspar-barite flux containing the relative proportions of fluorspar and barium sulphate desired, a mixture of fluorspar-barite ores of different compositions may be provided so that the aggregate content of fluorspar and barium sulphate approximates the desired proportions. For example, if the barium sulphate content of an available ore is too low for the desired purpose, it may be mixed with barite or a fluorspar-barite ore having a relatively higher percentage of barium sulphate than that desired in the flux, such mixture being effected in the proportions which will result in the desired relative proportions of fluorspar and barium sulphate in the batch.

The fluorspar-barite ore may be comminuted to a fineness sufficient to facilitate its incorporation with the other ingredients of a glass batch and employed in the proportions of about twelve to fifty pounds per thousand pounds of silica in the ordinary glass batch, containing sand, soda, and lime. Advantageous results may be obtained when the fluorspar-barite ore is reduced to a fineness of twenty to forty mesh. This fluorspar-barite ore is a highly efficient flux, and exhibits a marked fining action upon the glass batch. Furthermore in the manufacture of opal glass and glass in which a high alumina content is desirable, the fluorspar-barite ore is highly beneficial.

In order to overcome the characteristic green cast which is imparted to glass by the presence of small quantities of iron as an impurity in the raw materials, the fluorspar-barite ore may be incorporated with an agent capable of releasing nascent chlorine, or other gas having an affinity for iron. Examples of such an agent are magnesium chloride, sodium chloride, calcium chloride, zinc chloride, and the corresponding fluorides, bromides and iodides. In the case of magnesium chloride, the oxygen, which is made available upon reductiton of the barium sulphate present in the fluorspar-barite ore, displaces the chlorine from the magnesium chloride, since, under the temperature conditions prevalent in a melting glass batch, magnesium has a preferential affinity for oxygen over chlorine. Thus nascent chlorine is made available for reaction with the iron with the result that the iron products are readily released from the glass batch either through volatilization, or by being mechanically carried off by other gases.

In order to facilitate the reduction of the barium sulphate content of the fluorspar-barite flux, and thus to accelerate the release of nascent chlorine, if chloride, such as magnesium chloride, is employed a small percentage, as, for example, up to one percent of carbon or other active reducing agent, may be incorporated with the ground fluorspar-barite.

As an example of the fluxing material prepared in accordance with the present invention, a fluorspar-barite ore of the character containing 70% fluorspar and 30% barite may be ground to the desired fineness and mixed with magnesium chloride in an amount ranging from 2–25%. It is convenient to incorporate the magnesium chloride in the form of a water solution, and subsequently the materials may be dried in a suitable drier at temperatures below those which would bring about reaction or breaking down of the magnesium chloride. A suitable temperature at which this drying operation may be carried out is 20–30° C.

As illustrating the use with the flux of the present invention in the manufacture of clear transparent glass, a typical batch may be constituted as follows:

| Ingredients | Specific | Range |
|---|---|---|
| Sand | 1000 | 1000 |
| Soda | 350 | 340–380 |
| Burnt lime | 140 | 120–180 |
| Feldspar | 140 | 0–200 |
| Flux (fluorspar-barite ore, magnesium chloride) | 25 | 12–50 |

In the batch above given the flux may be composed of a fluorspar-barite ore containing about 60% fluorspar and about 40% barium sulphate which has been treated with about 4% by weight of magnesium chloride.

As illustrating the use of the flux of the present invention in the manufacture of opal glass the proportions shown in the following table may be employed:

| | |
|---|---|
| Sand | 1000 |
| Feldspar | 550 |
| Fluorspar-barite | 550 |
| Sodium nitrate | 20 |

The fluorspar-barite employed in the above batch may be one containing about 60% fluorspar and about 40% barium sulphate.

The improved activity and effective fluxing and fining action of the materials of the present invention may be attributable to the particular adaptability of the various ingredients: namely, calcium fluoride, barium sulphate and magnesium chloride to react in the presence of other glass batch ingredients either with the batch ingredients themselves, or with the reaction products of the fluxing agents.

While the precise chemical reactions taking place in a glass batch prepared in accordance with the present invention can not be ascertained with accuracy, it is postulated that the fluorspar exhibits a beneficial fluxing action upon the barium sulphate so that at temperatures above the melting point of fluorspar (1360° C.) reduction of barium sulphate to barium oxide proceeds according to the following equation:

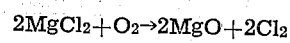

$$2BaSO_4 \rightarrow 2BaO + 2SO_2 + O_2$$

It is understood, of course, that the barium oxide shown on the right of the above equation is very probably combined in a glass batch with silica, producing a barium silicate, or other complex oxy-barium compound. At temperatures in excess of 1000° C., the gases, evolved in the above reduction of barium sulphate, will be composed of sulphur dioxide and oxygen rather than sulphur trioxide, and this is beneficial in that it makes available not only the desirable sulphur dioxide which is recognized to have a substantial fining action, but also makes available a nascent oxygen which is then free to react with any iron which is present in the batch in the form of a ferrous compound thereby converting it into a ferric compound.

Moreover, the availability of nascent oxygen in the case of a batch wherein an agent, such as magnesium chloride, has also been used is beneficial in making available nascent chlorine according to the following equation:

$$2MgCl_2 + O_2 \rightarrow 2MgO + 2Cl_2$$

The reaction of the above equation is reversible, but at the higher temperatures the tendency is for the reaction to move to the right as indicated. Moreover, if the content of magnesium oxide is somewhat less than the content of barium sulphate, as shown by the above mentioned formula, there will be a further tendency for the reaction to move to the right.

The availability of nascent chlorine in this manner makes possible the conversion of any iron oxide, present as a contamination in the flux or other raw materials, to iron chloride and this reaction proceeds particularly well at temperatures in excess of 1000° C., such as are encountered in the melting of a glass batch. Moreover, the nascent chlorine attacks the iron which may be combined in the form of complex iron aluminum silicates. Much of the ferric chloride formed appears to be volatilized and escapes with the other gases from the batch. In addition to the action of the fluorspar as a flux facilitating the reduction of barium sulphate and facilitating the melting of the other ingredients, some fluorine is probably released and may combine with hydrogen to form hydrogen fluoride or with the silicon present to produce silicon tetrafluoride. Therefore, in the manufacture of glass in accordance with the present invention at least four gases are evolved: namely, sulphur dioxide, oxygen, chlorine (part as ferric chloride) and fluorine (in part or in whole hydrogen fluoride or silicon tetrafluoride). Each of these gases exerts a fining action upon the glass which consequently results in a more homogeneous glass than would otherwise be obtained.

In addition to the pronounced fining action of this combination of gases, it is observed that less heat is required to accomplish the melting of a batch and a lower viscosity of the glass at the melting temperature with consequent increase in the flow of the glass is achieved. A lower content of soda may be employed and consequently the finished glass not only has improved solubility characteristics, but, due perhaps to the presence of barium, the glass has improved working characteristics, in that it has a high thermal coefficient of viscosity in the working range. Hence machine made glass articles may be manufactured more rapidly, and with less time in the mold than in the case of the ordinary glass batch. The glass resulting from the batch prepared according to this invention is brilliant and possesses a high resistance to thermal shock.

When the fluorspar-barite has been treated with a chloride, such as magnesium chloride, in accordance with the present invention, the fluxing agent is particularly active upon the iron content present in a batch. With the magnesium chloride intimately associated with the fluorspar-barite, which latter is of relatively high specific gravity, and thus has the tendency to fall to the bottom of a tank in which the melting is taking place, the release of nascent chlorine from the magnesium chloride takes place in the lowest point of the tank, and consequently has the maximum effect in combining with and volatilizing the iron present in the batch.

In the case of glass wherein the alumina content is desired to be high, either for decreased solubility or for other known characteristics of high alumina glass, it is observed that the flux of the present invention has a decided homogenizing action resulting in glass having uniform characteristics throughout the batch. When the flux of the present invention is employed larger proportions of alumina, such as feldspar, may be used in a batch than has heretofore been possible without encountering a tendency to devitrify.

While in the embodiments hereinbefore described, reference has been made to the use of a natural fluorspar-barite ore as the material constituting the primary ingredient of the flux, it is to be understood that some of the advantages of the material can be obtained from the use of an artificial mixture of calcium fluoride and barium sulphate. This is particularly true of co-precipitated calcium fluoride and barium sulphate as the co-precipitated product resembles the natural ore, insofar as the interlocked crystalline structure is concerned. A material more nearly approaching the beneficial characteristics of the natural ore, however, may be made by calcining the co-precipitated calcium fluoride and barium sulphate.

While in the foregoing description reference has been made to several embodiments illustrating glass batches prepared in accordance with the present invention, it is to be distinctly understood that the invention is not limited to the particular ingredients hereinbefore specified, nor to the precise proportions thereof which were given for the purpose of illustration. On the contrary, it is to be distinctly understood that the fluxing materials hereinbefore described are applicable at large to the art of glass making as well as the analogous arts. Accordingly such applications and the use of such equivalent constituents as may present themselves to those skilled in the art without departing from the spirit of this invention are, although not specifically described herein, contemplated by and within the scope of the appended claims.

Having thus described the invention, what is claimed is:

1. A glass batch comprising siliceous materials, fluorspar-barite ore, and chlorine in combined form with an element having a preferential affinity for oxygen under conditions encountered in a molten glass batch.

2. A glass batch comprising siliceous materials, fluorspar-barite ore, and magnesium chloride.

3. A glass batch comprising, siliceous materials, and fluorspar-barite ore.

4. A glass batch comprising, siliceous materials, and fluorspar-barite ore of a character containing 50-80% fluorspar and 50-20% barium sulphate.

5. A composition of matter comprising fluorspar-barite ore, and magnesium chloride.

6. In the art of making glass, the process comprising, adding to the glass batch a fluxing material containing fluorspar-barite ore.

7. In the art of making glass, the process comprising, adding to the glass batch a fluxing material containing fluorspar-barite ore and magnesium chloride.

PHILIP E. HARTH.